Figure 1:
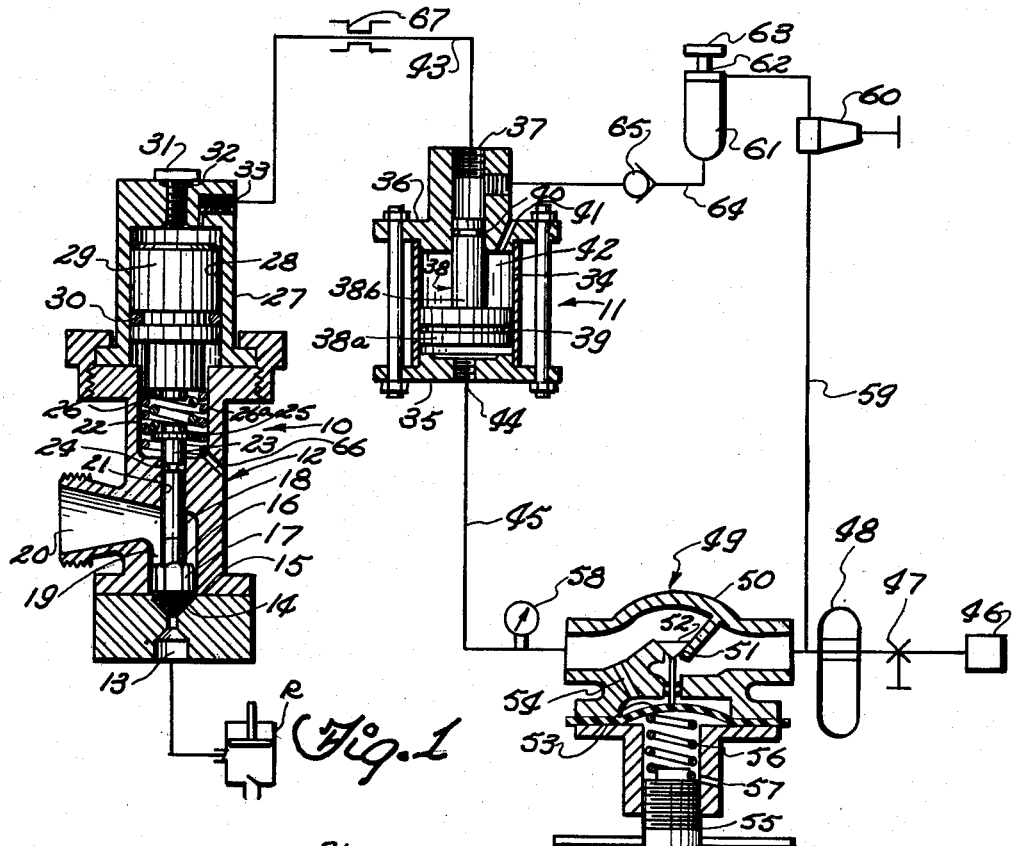

May 11, 1965

A. H. WAKEMAN ETAL 3,182,971

HOMOGENIZING VALVE CONTROL

Filed Oct. 21, 1963

INVENTOR.
Alden H. Wakeman
BY Dan C. Loahen
Pendleton, Neuman,
Seibold & Williams
Attorneys 3,182,971
HOMOGENIZING VALVE CONTROL
Alden H. Wakeman, Lake Mills, and Dan C. Roahen, Fort Atkinson, Wis., assignors, by mesne assignments, to St. Regis Paper Company, New York, N.Y., a corporation of New York
Filed Oct. 21, 1963, Ser. No. 317,570
5 Claims. (Cl. 259—98)

This invention relates to homogenizing apparatus and more particularly to a means for automatically and accurately controlling the pump pressure at the homogenizing valve.

A homogenizer is a high pressure pump which discharges a fluid mixture such as milk through a throttling valve against an abutment or through a porous resilient plug as shown in Hanson United States Patent No. 2,304,689 for the purpose of breaking up the fat globules into small particles in uniform dispersion in the milk serum in a state of stable emulsion. In order to achieve uniformity of the product it is essential that the operating conditions such as product temperature, rate of flow and operating pressure be held constant.

Previously, the throttling valve has usually been resiliently held against its seat by a strong spring force or, as shown by Hanson, by compression of the resilient plug which reduces the size of the interstices with or without the use of a spring. A manually operated screw is used to compress the spring or resilient plug to adjust the fluid pressure to the desired value. Experience has shown that the pressure will exhibit undesirable variations over prolonged periods of operation, requiring readjustment of the screw. It must be understood that the pumps used in homogenizers are of the positive displacement, plunger type and that the instantaneous pumping rate varies cyclically, the degree of variation depending upon the number of pump plungers. Consequently, there is a cyclical pressure pulsation at the inlet to the homogenizing valve. The pulsations are transmitted to the spring, which may contribute to drift of pressure in operation. Furthermore since the spring is extremely strong and not very long, a minute movement of the valve results in a substantial change in the spring force.

The spring adjusting screw must be adjacent to the homogenizing valve which may be at an inconvenient location and it may take great effort to turn it.

An object of this invention is to provide automatic means for controlling the average pressure ahead of a homogenizing valve or, more specifically, controlling the pressure drop across a homogenizing valve.

Another object is to provide means for controlling said pressure which are not subject to drift over prolonged periods of operation.

Another object is to provide such control means which may be accurately adjusted with minimum effort.

Another object is to provide such control means wherein the point of adjustment may be located at a remote but convenient and accessible location.

Another object is to provide such a control means which provides the sensitivity of adjustment with sufficient damping to restrict destructive valve pulsation.

Another object is to provide such a control means which utilizes the moderate air pressure commonly available for use with air operated instruments and which is usually available in factories.

Still another object is to provide a pressure control for a very high pulsating operating pressure wherein the average high operating pressure is measured by an instrument subjected to a nonpulsating low pressure which bears a direct proportionality to the operating pressure.

Although these objects have been stated in connection with homogenizers, this invention is equally applicable to the adjustment of other nozzles in response to upstream pressure as for example in spraying equipment.

Further and additional objects will appear from the description and appended claims.

In carrying out this invention in one illustrative form, a homogenizing valve is forced against its seat by the action of a liquid driven hydraulic cylinder. The pressure of the hydraulic liquid is developed by air pressure. The hydraulic pressure may be raised to much higher than the air pressure by means of a hydraulic pressure booster having pistons of different diameters. The air is delivered to the booster from a source through an adjustable pressure reducing valve (pressure regulator) which maintains the selected air pressure in the booster. This booster air pressure then by proportionality maintains a fixed average pressure of the hydraulic liquid. The hydraulic liquid in the system is relatively incompressible and the friction of the hydraulic piston and the booster cylinder together with hydraulic line friction as well as the inertia of these elements exerts a damping action and minimizes pulsation of the homogenizing valve caused by the pump pulsations. The air in the booster system is however quite compressible thus effectively keeping pulsations from the pressure regulator and eliminating the possibility of change in setting due to vibration. Furthermore in view of the compressibility of the air, the effect of a spring of infinite length is obtained, so that a change in the position of the homogenizing valve will have no discernible effect on the pressure setting. The air pressure regulator may be mounted at a convenient location and its adjustment requires very little effort.

Figure 2:
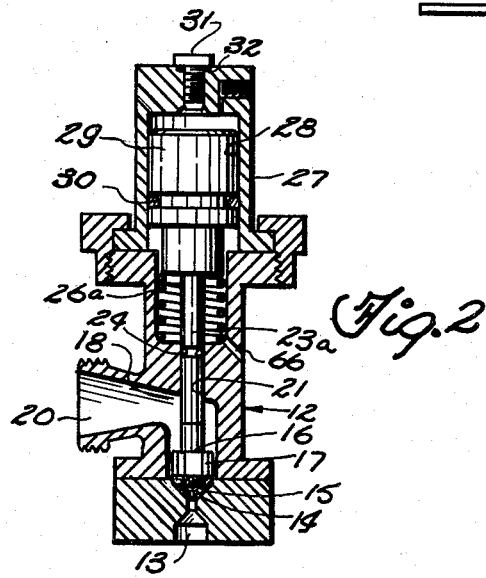

For a more complete understanding of this invention reference should be made to the drawings, wherein:

FIG. 1 is a partial schematic and partial cross-sectional view of a homogenizer system employing the teachings of this invention, and FIG. 2 is a cross-sectional view of a modified form of homogenizer valve.

Referring now to FIG. 1 of the drawings, 10 is a homogenizing valve assembly including a hydraulic actuator and 11 is a hydraulic booster which develops suitable hydraulic pressure to control the action of the homogenizing valve 10.

The homogenizing valve assembly 10 comprises a valve body 12 having an inlet port 13 to receive the product to be homogenized from a high pressure pump R and communicating with a valve seat 14. Positioned on the valve seat is a valve member 15 which may be a resilient mass or matrix of matted spring wire having interstices throughout its structure as disclosed in the patent of Hanson, or other suitable construction. A compression block 16 is positioned upon the valve member 15, the block being provided with a plurality of flow passages 17 extending through the block.

The valve body is formed with a chamber 18 including an axial bore 19 communicating with valve seat 14 and with a product outlet passage 20. The valve body is also formed with a stem guide bore 21 and a spring chamber 22 aligned with the axial bore 19 and the seat 14. A push rod 23 having O-ring seal 24 and provided with spring seat 25 is slidably inserted in guide bore 21 and is forced against compression block 16 by spring 26. Attached to valve body 12 is an actuator cylinder 27 having bore 28 in which plunger 29 is slidably fitted. The plunger 29 carries O-ring seal 30. Screw 31 is an adjustable stop for plunger 29, and O-ring 32 forms a pressure tight seal between screw 31 and actuator cylinder 27. Port 33 serves to admit and discharge hydraulic pressure fluid to actuator cylinder 27 on top of plunger 29 which compresses spring 26 against push rod 23 and applies force to compression block 16 so as to urge valve 15 against seat 14. Light spring 26a lifts plunger 29 at unloaded condition.

The hydraulic booster 11 has a large bore cylinder 34 clamped between heads 35 and 36. Head 36 is provided with a small bore 37 axially aligned with large bore cylinder 34. Step piston 38 is free floating having its large end 38a provided with O-ring seal 39 disposed in large bore 34 and its small end 38b provided with O-ring seal 40 disposed in small bore 37. Vent hole 41 communicates with the space 42 between the large end 38a of piston 38 and head 36 and with the atmosphere. The bore 37 above piston 38 is connected by conduit 43 to port 33 of the valve acuator cylinder 27. Port 44 in head 35 is connected by conduit 45 to a source of compressed air 46 to enable imposing air pressure under the large end of piston 38. Bore 37 above the small end of piston 38, conduit 43 and bore 28 above plunger 29 are filled with a hydraulic fluid. If the small diameter of piston 38 is "d" and the large diameter is "D," and assuming the applied air pressure (gauge) is P and the resulting hydraulic fluid pressure in bore 37 is $p$ (gauge), then the gauge pressure of the hydraulic fluid $p=(D/d)^2 P$. The hydraulic pressure $p$ is therefore greater than the air pressure P by a constant ratio for the system. If for example the diameters "D" and "d" are proportioned so that $(D/d)^2=10$, then the hydraulic pressure $p$ will always be 10 times the air pressure P.

The conduit 45 is provided with valve 47 to permit shutting off the air supply 46, with air filter 48 and with an automatic pressure regulator 49. The regulator 49 has a valve body 50 having seat 51 and valve 52 attached to flexible diaphragm 53. The down stream pressure is transmitted to the upper side of the diaphragm by passage 54. Screw adjustment 55 compresses the spring 56 against the underside of diaphragm 54 thus opposing the down stream pressure. The space under diaphragm 53 is equalized to the atmosphere through vent hole 57. The down stream air pressure may therefore be set at any desired value not exceeding the air pressure P of source 46 by the adjustment of screw 55. The construction of the regulator 49 is illustrative only, and other available suitable regulators may be utilized. A pressure gauge 58 indicates the operating air pressure.

Line 59 from air pressure source 46 is provided with a pressure regulator 60, which may be similar to regulator 49, and leads to the top of hydraulic fluid reservoir 61 which is fitted with a hydraulic fluid filling connection 62 and a plug 63. The bottom of the reservoir 61 is connected to bore 37 by line 64 which is fitted with check valve 65 to prevent back flow to the reservoir 61. When regulator 49 is shut off thus relieving air pressure in line 45, the spring 26a raises plunger 29 forcing plunger 38 down. The oil pressure in line 43 drops to a low value and if plunger 38a is not down against head 35 air pressure on top of the oil in chamber 61 forces check valve 65 open and forces plunger 38a to the limit of its travel. The regulator 60 must be adjusted at a low enough pressure not to depress spring 26a. In this manner the hydraulic system is kept adequately charged with fluid and compensates for possible seepage.

When the homogenizer is put into operation the regulator 49 is shut off so that no pressure is imposed on the homogenizer valve 14 and the high pressure pump will start virtually unloaded. The air pressure from regulator 60 is then greater than the oil pressure in bore 37 so that hydraulic fluid from the reservoir 61 fills bore 37, line 43 and cavity 28. The pressure controlled by regulator 60 is low enough to have no appreciable effect on the starting of the high pressure pump. After the pump has been started the pressure regulator 49 is adjusted to the air pressure as indicated by the air pressure gauge 58 which experience has shown will produce the desired degree of homogenization of the product. This air pressure, by its action on piston 38, produces the amplified hydraulic pressure on plunger 29 to force the valve 15 against the seat 14 and thereby to regulate the desired average product pressure ahead of the homogenizer valve 15.

As previously indicated, the high pressure pumps (R) usually employed in homogenizing systems are of the plunger type, and the instantaneous flow rates fluctuate to a degree dependent upon the number of plungers. As a consequence, and since the fluid product is virtually incompressible, the instantaneous flow rate past valve 15 also fluctuates which results in pressure pulsations under valve 15. These pulsations are transmitted to spring 26 which will be slightly compressed at the high pressure point of the pulsation and elongated at the low pressure point thus permitting the valve 15 to slightly open and close or permit the resilient material to expand and contract with consequent increasing and decreasing of the size of the interstices. However, the spring will transmit a substantial portion of the varying forces to the follower-piston 29, and from the piston 29, through the hydraulic system to piston 38 and the air pressure system. The friction and inertia of each of these elements, and finally the compressibility of the air system, will dampen and absorb these fluctuations. Further considering the compressibility of air, there will be little or no pulsation of the operating air pressure in the hydraulic booster 11 or on the pressure regulator 49 and the pressure gauge 58. This is important because the adjustment of the fluid inlet pressure at port 13 still depends upon the accuracy of a spring but now it is the spring 56 in regulator 49 instead of the spring 26, and this spring 56 is not subject to significant pulsating forces which would tend to destroy fine adjustment.

Since the hydraulic fluid may flow back and forth with pulsations of the piston 29, the valve 10 may be further simplified by omitting spring 26 as in FIG. 2. In this modification, a rigid unitary push rod 23a is connected to the support member 17 and abuts the underside of the piston 29 which is in axial alignment with the valve inlet and valve seat 14.

In each valve 10, the body 12 is formed with a drain opening 66 to prevent pressure accumulation above O-ring 24 due to any leakage of hydraulic fluid past O-ring 30. This insures against contamination of the product passing through the valve.

The spring 26 and the piston 29 automatically compensate for any change in the position of the valve while maintaining a substantially constant load thereon and thereby providing a substantially constant pressure drop across the valve. Also any changes due to factors such as erosion of the valve or seat, solids passing through or clogging of interstices of the valve, which would result in change in pressure drop and therefore result in a change in position of valve 15 will be automatically compensated for by the improved system. Further the virtual absence of pressure pulsations of the air in line 45 permits gauge 58 to be a simple readily available inexpensive pressure gauge which will have a long life and reliability.

If it is desired to increase the damping effect of the hydraulic fluid a throttle valve or fixed orifice may be inserted in line 43 as at 67.

Use of a substantially incompressible liquid under high pressure as the hydraulic fluid for operating piston 29 facilitates a convenient and practical design of apparatus. High pressures may be conveniently and inexpensively obtained in a liquid hydraulic system from a comparatively low pressure fluid source, such as is usually available in factories, through a pressure booster as at 11. The high pressure system in turn permits designing the cylinder 27 and piston 29 as small compact elements. Finally, the damping and control response results of a liquid hydraulic-pneumatic system seem advantageous over an all-pneumatic arrangement.

It will thus be seen that a homogenizing valve control system has been provided which will automatically control the average pressure ahead of a homogenizing valve and avoid drift but which may be accurately and conveniently adjusted. The regulating means is remote from the valve, removed and protected from rigorous pulsations or vibrations of the valve, operates under low pressure, and may be placed in a convenient and accessible location.

While a particular embodiment of this invention is shown above, it will be understood, of course, that the invention is not limited thereto, since many modifications may be made by those skilled in this art, particularly in light of the teachings herein. It is contemplated, therefore, by the appended claims, to cover any such modifications as fall within the true spirit and scope of this invention.

We claim:

1. A homogenizing valve including a valve seat, a valve member to be urged toward said seat to effect homogenization of a product forced past said valve seat, hydraulic control means connected to said valve member for urging said valve member toward said seat, and pneumatic control means governing said hydraulic control means, for exerting a substantially uniform predetermined force on said valve member towards said seat as such product is forced past said valve seat, and wherein said control means include a cylinder having one end adapted to provide hydraulic pressure to said valve member, to urge the latter toward such valve seat, a piston mounted for reciprocation within said cylinder, and a pressurized fluid inlet disposed at the opposite end of said cylinder; the area of the piston surface adjacent said fluid inlet being substantially greater than the area of the piston surface adjacent said cylinder one end.

2. A regulated valve including an inlet passage, an outlet passage and an internal valve seat disposed therebetween, a valve member to be urged toward said seat to permit passage through said valve of fluid above a predetermined pressure, hydraulic control means connected to said valve member for urging said valve member toward said seat, and pneumatic control means governing said hydraulic control means, for exerting a substantially uniform predetermined force on said valve member towards said seat as such product is forced past said valve seat, and wherein said control means include a cylinder having one end adapted to provide hydraulic pressure to said valve member, to urge the latter toward such valve seat, a piston mounted for reciprocation within said cylinder, and a pressurized fluid inlet disposed at the opposite end of said cylinder; the area of the piston surface adjacent said fluid inlet being substantially greater than the area of the piston surface adjacent said cylinder one end.

3. A homogenizing valve as in claim 1 and including a closed liquid hydraulic system communicating with said one end of said cylinder to operate said valve member, and a pneumatic pressure source connected to said fluid inlet.

4. A homogenizing valve as in claim 3, and pneumatic pressure means to refill the liquid hydraulic system to compensate for leakage.

5. A homogenizing valve as in claim 4, and means to refill the liquid hydraulic system functioning periodically whenever the pressure in the hydraulic system is lower than the pneumatic pressure means.

References Cited by the Examiner
UNITED STATES PATENTS 1,163,541 12/15 Hultin _____ 251—57 X
2,304,689 12/42 Hanson _____ 138—42

CHARLES A. WILLMUTH, *Primary Examiner.*

G. J. NORTH, *Examiner.*